United States Patent
Fidrych

(10) Patent No.: US 8,984,725 B2
(45) Date of Patent: Mar. 24, 2015

(54) BUCKLE MECHANISM

(76) Inventor: Paul Fidrych, Portland, OR (US)

(*) Notice: Subject to any disclaimer, the term of this patent is extended or adjusted under 35 U.S.C. 154(b) by 654 days.

(21) Appl. No.: 13/180,374

(22) Filed: Jul. 11, 2011

(65) Prior Publication Data

US 2013/0014707 A1    Jan. 17, 2013

(51) Int. Cl.
| A44B 11/25 | (2006.01) |
| A01K 25/00 | (2006.01) |
| B60R 22/00 | (2006.01) |
| A01K 27/00 | (2006.01) |

(52) U.S. Cl.
CPC .............. *A01K 27/005* (2013.01); *A44B 11/25* (2013.01); *A44B 11/253* (2013.01)
USPC .............................................. 24/638; 24/637

(58) Field of Classification Search
CPC ..... A01K 27/005; A44B 11/25; A44B 11/253
USPC ........... 24/638, 646, 170, 191, 193, 323, 633, 24/637; 119/863
See application file for complete search history.

(56) References Cited

U.S. PATENT DOCUMENTS

| D46,861 S | 1/1915 | Christi |
| 1,849,258 A | 3/1932 | Washburn |
| 1,853,889 A | 4/1932 | Alterson |
| 1,876,477 A | 9/1932 | Troendly |
| 1,988,890 A | 1/1935 | Fenton |
| 1,999,167 A | 4/1935 | White |
| 3,137,907 A * | 6/1964 | Unai ................................ 24/646 |
| 3,179,992 A * | 4/1965 | Murphy, Sr. .................... 24/638 |
| 3,241,206 A * | 3/1966 | Greenfield ...................... 24/646 |
| 3,246,377 A * | 4/1966 | Brown ............................. 24/646 |
| 3,255,502 A * | 6/1966 | Hollins ........................... 24/191 |
| 3,273,214 A * | 9/1966 | Keeling .......................... 24/637 |
| 3,279,020 A * | 10/1966 | Smith ............................. 24/637 |
| 3,285,700 A * | 11/1966 | Prisbe ............................. 24/646 |
| 3,393,433 A * | 7/1968 | Barcus ............................ 24/646 |
| 3,576,056 A * | 4/1971 | Barcus ............................ 24/638 |
| 3,760,464 A * | 9/1973 | Higuchi .......................... 24/323 |
| 3,775,813 A * | 12/1973 | Higuchi .......................... 24/323 |
| 4,135,267 A | 1/1979 | McKinney, Sr. et al. |
| 4,321,891 A | 3/1982 | Moeller |
| D266,479 S | 10/1982 | Hayakawa |
| 4,414,865 A | 11/1983 | Brooks et al. |
| 4,967,622 A | 11/1990 | Phillips |
| 4,979,407 A | 12/1990 | Hernandez et al. |

(Continued)

OTHER PUBLICATIONS

Kurgo Wander Collar web-site, Dec. 10, 2009, www.kurgo.com/products./wcol.html, Author Unknown.

*Primary Examiner* — Robert J Sandy
*Assistant Examiner* — Louis Mercado
(74) *Attorney, Agent, or Firm* — Wolff Law Offices, PLLC; Kevin Alan Wolff

(57) ABSTRACT

An improved buckle device for a limited release application such as a pet collar, which includes a buckle assembly having a cover having a top with a downward turn release lip. The release lip, in the closed position, does not extend past the frame member and is recessed within the sidewalls and bottom wall of the frame. The cover includes high-positioned ledges that cause a cam latch to release a clasp from the buckle only when the cover has traveled at least about 80-degress from horizontal. The cover hingeably mounts to a frame by means of a pin. The latch is supported by the pin. Tension against the cover is provided by a first biasing member and the latch cam is forced downward by a second biasing member.

26 Claims, 12 Drawing Sheets

(56) References Cited

U.S. PATENT DOCUMENTS

| | | | |
|---|---|---|---|
| 5,123,147 A * | 6/1992 | Blair .............................. 24/636 |
| 5,247,905 A | 9/1993 | Arakawa |
| D363,257 S | 10/1995 | Anscher |
| 5,467,743 A | 11/1995 | Doose |
| D365,044 S | 12/1995 | Anscher |
| 5,474,033 A | 12/1995 | Mitchell, Jr. |
| 5,785,008 A * | 7/1998 | Liu .............................. 119/831 |
| 5,785,010 A | 7/1998 | Koch |
| 6,185,772 B1 | 2/2001 | Bates |
| D471,678 S | 3/2003 | Hanna |
| 6,530,129 B1 * | 3/2003 | Cheng ............................ 24/200 |
| 6,880,490 B2 | 4/2005 | Hanna |
| D504,984 S | 5/2005 | Jones |
| D536,280 S | 2/2007 | Wemmer |
| D542,710 S | 5/2007 | Yoshiguchi |
| 7,237,292 B1 | 7/2007 | Endres |
| 7,263,750 B2 * | 9/2007 | Keene et al. ................... 24/638 |
| D579,820 S | 11/2008 | Brown |
| D581,830 S | 12/2008 | Slabaugh |
| D623,030 S | 9/2010 | Spater |
| 7,904,997 B2 * | 3/2011 | Foubert .......................... 24/631 |
| 8,371,250 B2 | 2/2013 | Konovalov |
| D682,155 S | 5/2013 | Parsons |
| D698,503 S * | 1/2014 | Fidrych et al. ............... D30/152 |
| 2006/0102102 A1 | 5/2006 | Bennett et al. |
| 2011/0154955 A1 * | 6/2011 | Fidrych ........................ 81/3.09 |

* cited by examiner

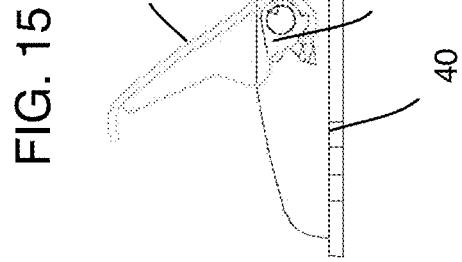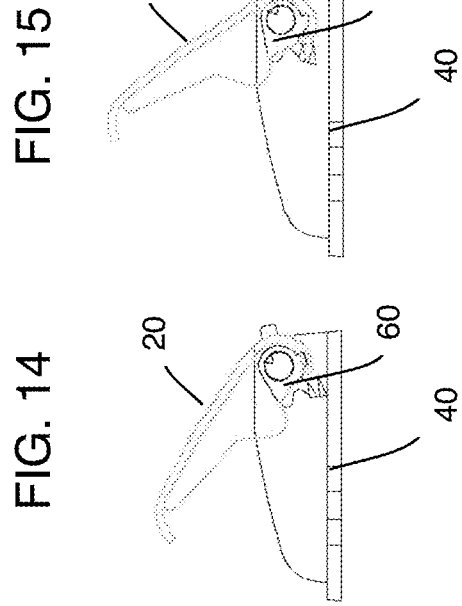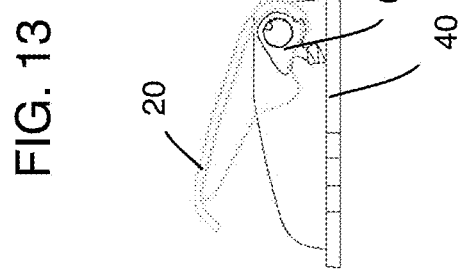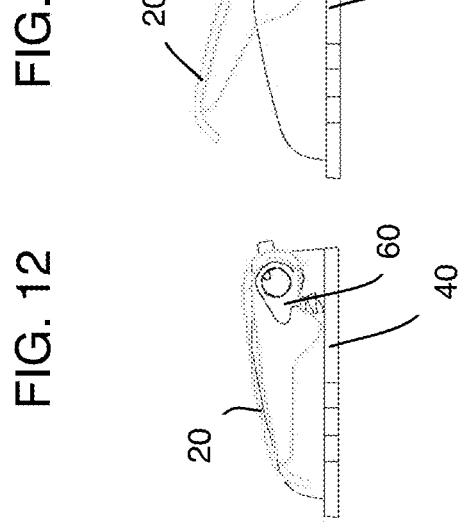

BUCKLE MECHANISM

BACKGROUND

The present invention relates to tab-and-latch mechanisms for a strap member for selectively and releasably coupling opposing ends of a strap by a mechanical device, and more specifically an improved seat-belt style tab-and-latch mechanism for a strap member wherein the strap member is part of limited release applications such as a pet collar, pet harness, pet muzzle, or any general purpose strap for any general purpose bag.

Seatbelt-style buckle mechanisms for selectively coupling and releasing two ends of a web-material, such as a seatbelt, are generally known in the art. In the prior art of seatbelts, it is very important that the latch, when closed, is secure under high impact loads, but it is equally important that the latch quickly and easily release with minimal effort or force when the wearer (or rescuer) needs to uncouple the restraint webbing. Accordingly, the current art teaches an over-extending release lip end on a cover of a latch buckle, with very little upward rotation of the cover relative to the frame for release of the internal latch from the female clasp. Typically, the cover only needs to travel 5-degrees to 20-degrees for the latch to release.

Other latch mechanisms include an exemplary seat-belt style tab and latch mechanism, such as the Quick Releasable Buckle for Safety Belts described by F. L. Davis in U.S. Pat. No. 2,710,999 issued on 1952 Feb. 28 wherein a buckle made up of a channel form body having freely operable take-up means at one end for holding the strap, and a normally closed but instantly releasable dog or pawl at the opposite end for securing the strap. The adjustable take-up for strap is shown as consisting of a pull bar riveted or otherwise firmly secured across and between the parallel sides or flanges of the channel shaped base, a second, strap deflecting bar similarly mounted but located nearer the end of the base and a movable loop holding bar adapted normally to seat in notches in the ends of the side flanges but free to be separated from the base for belt lengthening purposes. The opposite anchored strap is removably connected with the buckle body by having a plate secured to the free end of the same and which is provided with a projecting tongue portion of a width to enter between the side flanges of the buckle body and having an opening therein to receive the abruptly shouldered locking dog or lug extension. To enable instant, free release of the holding dog, a hand lever secured by rivets or other fastenings over the top of the cam, and this releasing lever is utilized as a cover and protective guard for the parts located between the sides of the base by extending it laterally, At its free end the releasing handle may be upwardly curved for convenient, quick grasp by the fingers.

Davis further instructs that the leverage provided by the handle is sufficient to enable release of the dog from the end plate with even a light pull, and the tension of the spring is sufficient to hold the dog closed against any accidental or unintentional release. This feature, however, for use in limited release applications such as a dog collar mechanism has certain drawbacks as the cover can easily be unintentionally caught when a pet-dog is running through bramble, or is rough-playing with other canines. Further, the quick-release nature, while important for use as a seatbelt, is not desired in a pet collar.

This overhanging cover design is well-used in the art of seat-belt latch release mechanism. For example, the Safety Buckle described by Higuchi in U.S. Pat. No. 3,760,464 issued on 1972 Sep. 25, similarly uses an easy-opening, single spring, extended lever-cover for quick-release of a seat belt. Notably, Higuchi includes a latch with biasing spring designed to release the tab in direct proportion to rotation of the cover.

Other designs, as exemplified in U.S. Reissue Pat. No. 26,754 of 1970 Jan. 6 to Fisher, have limitations due to their use as automobile safety belts. For example, Fisher teaches that safety belt buckles often employ relatively long, heavy, and therefore, cumbersome release handles. This has been a requirement to obtain sufficient mechanical advantage to effect opening of the buckle under load. Fisher, in an attempt to improve upon the then-state-of-the-art design of seatbelt buckles presents a relatively short, light and therefore easily assembled and operated release handle. However, Fisher's design is ill-suited for a buckle for a limited release application such as a pet collar because such a design would open too-easily and inadvertently when the pet was working or at play.

Yet other known designs, as taught for example by Blair in U.S. Pat. No. 5,123,147 issued on 1992 Jun. 23, include a U-shaped base having upstanding sidewalls that support a pin carrying a locking cam, a spring, and a handle: Lifting one end of the handle rotates the locking cam against the closed-biased spring. A clasp or plate on one end of a belt, inserted between the base sidewalls, clamps to a protrusion on the base by the spring-loaded cam when the handle is released.

Limitations of such known mechanisms when adapted for use in limited release applications such as a dog collar release mechanism include having a cam that releases in direct proportion with the opening of the cover handle and having an handle with an end extending beyond the housing to facilitate opening—such designs are ill-suited for these applications because the over-extending handle would be prone to catch on objects when the dog is working or playing, and the direct translation of movement of the handle to release the cam would result in inadvertent releasing of the tab: This would enable the collar to fall off the dog and would therefore present a danger to the dog or to the public, or both as the dog would no longer be under control of a leash connected to the collar.

Other limitations in the known art include single biasing member, which provides resistance for the cover or handle from unintentional lifting, but also provides biasing against the latch cam to secure the tab in the buckle. This biasing member results in a direct proportional lifting of the latch for quick release of the cam to release the tab: While this feature is very important for quick release of a seatbelt buckle under load (for example, after a crash), this feature, however, is counter-productive when used on a pet collar. Quite the opposite is desired, a pet collar should be difficult to open, particularly under load for obvious reasons, a dog being restrained under stress may pull strongly against the collar and under these circumstances it is very important to not release the collar. For example, if the dog is used in law enforcement, or for hunting, or even rough play, this common feature in the known art is not desired.

Thus, there remains a need for a seat-belt style tab and latch mechanism, adapted for use as a closure mechanism for limited release applications that includes features that prevent unintentional releasing of the tab from the latch, deter the release flap from unintentional movement during rough-play, work, or other high-energy activities.

SUMMARY OF THE INVENTION

The present invention adapts known seatbelt buckle designs common to the automotive and aircraft industry to better serve as a release mechanism in limited release applications. Accordingly, the various embodiments of the present invention include a latch handle that has a latch end that bends inward toward the housing of the latch, and present a very narrow gap between the housing end the latch end so that it is very difficult for the handle to be activated to release the tab from the housing. To further prevent unintended opening of the cover, the lip end of the cover, when in the normal-closed position, lies within the boundaries of the frame sidewalls and bottom wall. Further, the present invention includes a cam latch that resists opening until the latch handle has traveled more than at least 45-degrees, and preferably about 70 to 85-degrees of travel.

DRAWING

FIG. 12 is a side view illustrating the buckle assembly of FIG. 1 in a closed position.

FIG. 13 is a side view illustrating the assembly of FIG. 12 in a partial closed position.

FIG. 14 is a side view illustrating the assembly of FIG. 12 in yet another partial closed position.

FIG. 15 is a side view illustrating the assembly of FIG. 12 in an open or released position.

DESCRIPTION OF THE INVENTION

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

Figure 1:
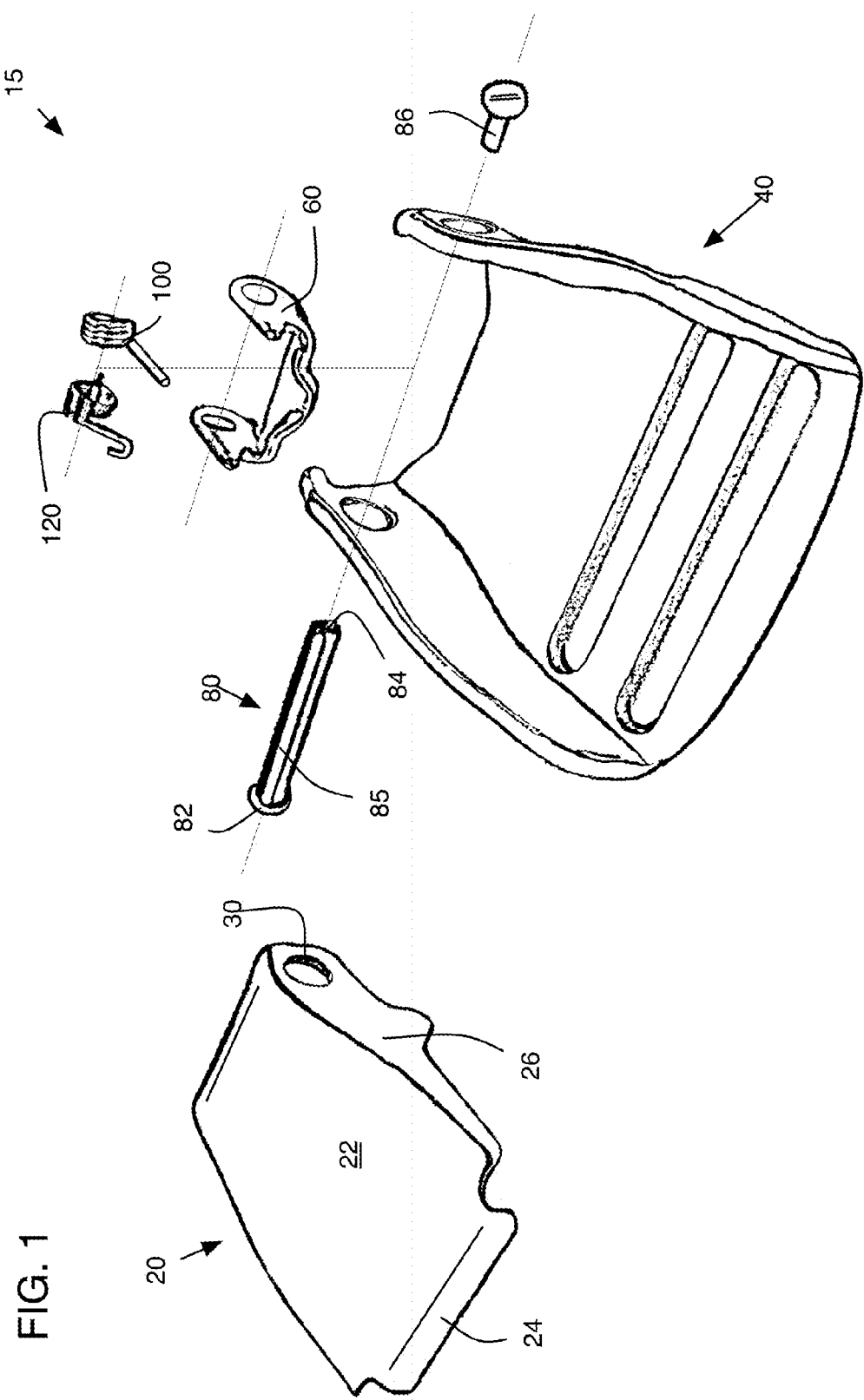
FIG. 1 is an exploded back view of a buckle assembly according to a first preferred embodiment of the present invention.

FIG. 1 illustrates a preferred embodiment according to the present invention. A buckle assembly 15, shown in an exploded view, includes a cover 20 having a top 22 with a downward turn release lip 24 and two opposing sidewalls. The left sidewall 26 defines a pin through-hole 30. A pin 80 having a head 82, shaft 85 and tail 82 inserts through and supports the cover 20, latch cam 60, and springs 100 and 120, and, further, is supported by the frame 40. The pin 80 includes a cap 86.

Figure 2:
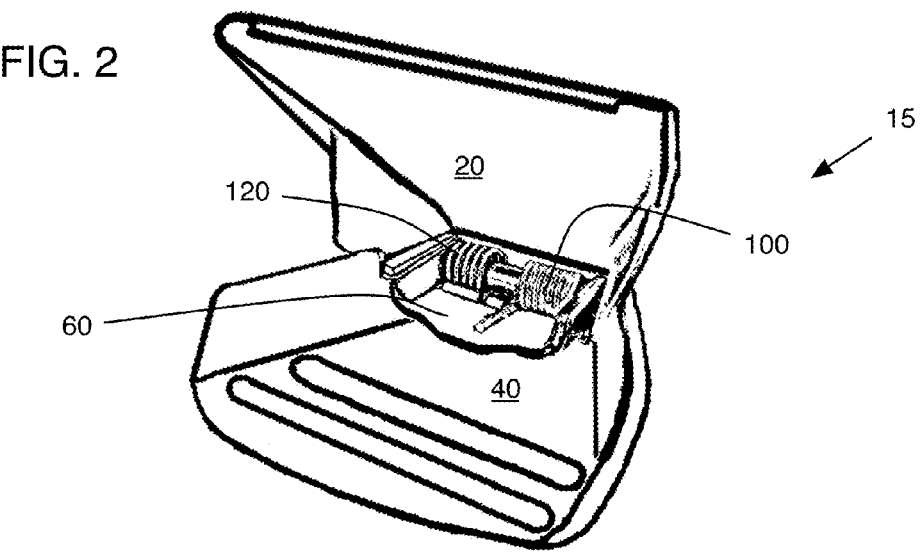
FIG. 2 is an offset back view of an assembled buckle assembly according to the embodiment of FIG. 1.

FIG. 2 illustrates the buckle assembly 15 of FIG. 1 in an assembled condition, and it is viewed partially open from the back. The cover 20 hingeably mounts to the frame 40 by means of the pin 80. The cam latch 60 is supported by the pin and tension against the cover 20 is provided by a biasing member, spring 120 (to force the cover in a normally closed position). And, the latch cam is forced downward by a biasing member, spring 100.

Figure 3:
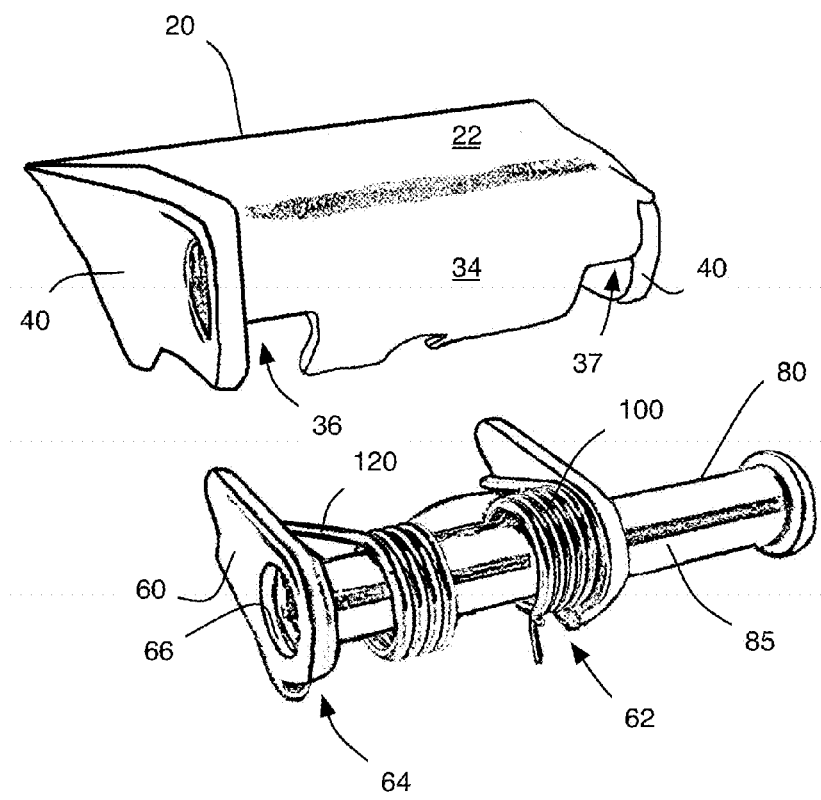
FIG. 3 is a partial detail view showing an offset frontal view of a portion of the cover and latch cam of the embodiment of FIG. 1.
Figure 4:
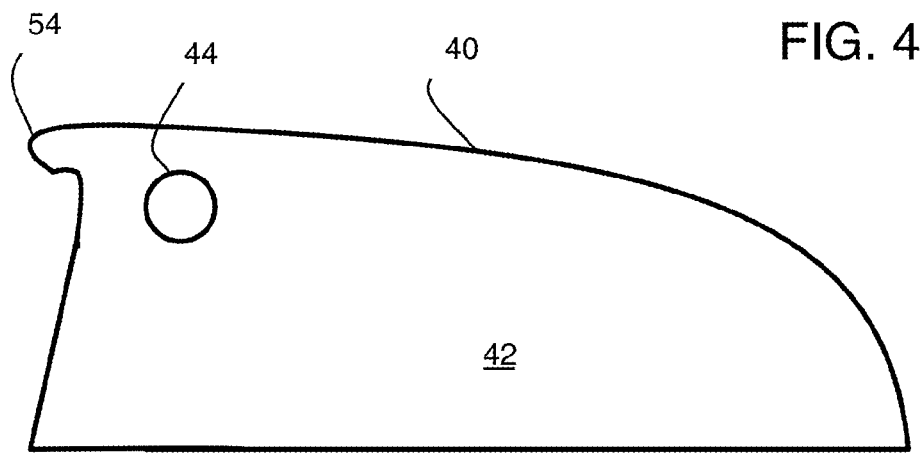
FIG. 4 is a side view of a frame member of the embodiment of FIG. 1.
Figure 5:
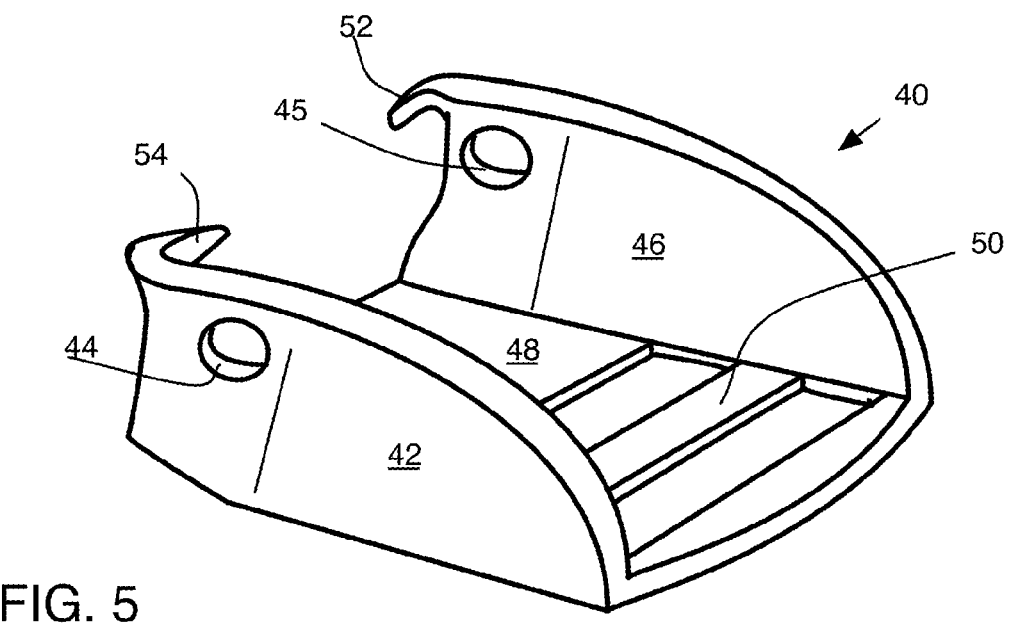
FIG. 5 is an offset back view of the frame member of FIG. 4.
Figure 6:
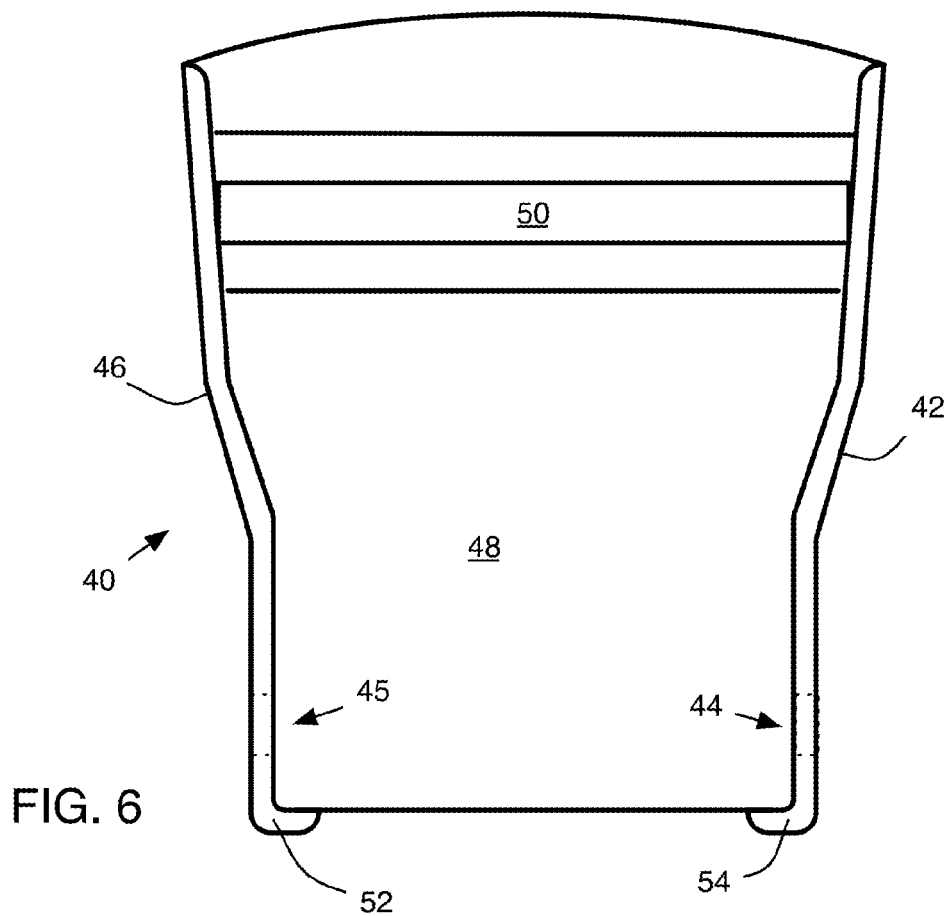
FIG. 6 is a top view of the frame member of FIG. 4.
Figure 7:
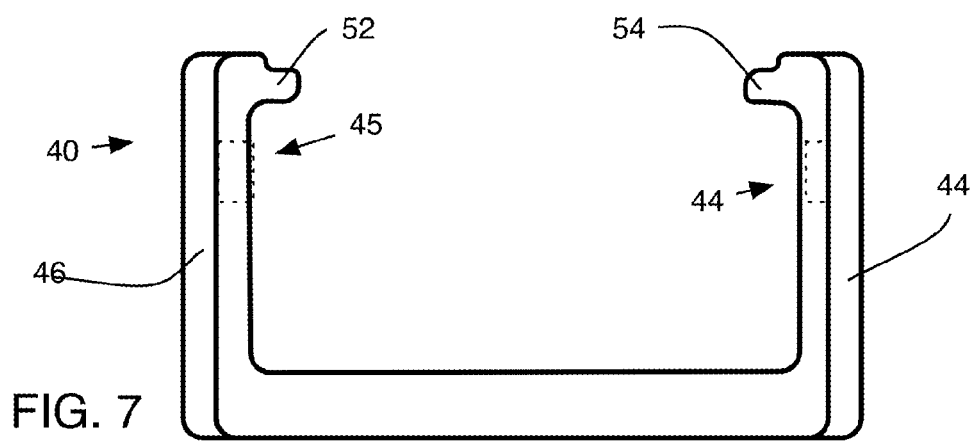
FIG. 7 is a front view of the frame member of FIG. 4.

FIG. 3 details the relationship of the cover 20 to the latch cam 60. The cover includes a downward curving nose portion 34 and defines a left and right ledge feature 36, 37. This ledge feature is placed rather high on the nose—the deeper the ledge (higher on the nose), the more upward rotation (of the cover relative to the stationary frame 40) is required to release the latch 60 from the female clasp (not shown in this view). A first spring 100 provides downward (closed) force on the cover, keeping the cover in a normally closed position—that is it is nearly flush with the frame. And, spring 120 biases the latch cam downward to lock in the female clasp. This enables independent upward travel of the cover that can be 'tuned' by the ledge 37 depth before the cover causes the latch cam to rotate upward. The cover 20 also includes a downward turned lip 24. Importantly, this lip does not protrude beyond the frame 40 sidewalls 42 and 46—this is contrary to the teaching in the art wherein a lip extends past the frame and doesn't turn downward: In the prior art, for use such as a seatbelt buckle assembly, it is important for the lip to extend beyond the frame so that the user or rescuer can readily actuate the cover to release the clasp. In contrast, the present invention incorporates a downward turned lip 24 that terminates in close proximity to the base 48 of the frame 40 and does not extend beyond a curving plane defined by the base sidewalls 42 an 46.

In the preferred contemplated embodiments of the present invention, biasing member (springs 100 and 120) are helical torsion springs, a metal wire in the shape of a helix (coil) that is subjected to twisting about the axis of the coil by sideways forces (bending moments) applied to its ends, twisting the coil tighter. Torsion springs obey an angular form of Hooke's law of elasticity: The torque exerted by the spring in Newton-meters is the angle of twist from its equilibrium position in radians times a spring constant. Thus, as the angle of the cover (relative to the horizontal, closed position) increases, so does the force of the spring opposing that rotation (opening of the cover), further minimizing the likelihood that the cover will open unintentionally and releasing the clasp.

FIGS. 4-7 detail the frame member 40. The frame member 40 includes a generally flat bottom or base 48. The base connects to two oppositely disposed and upward turned sidewalls, left wall 46 and right wall 42. Each sidewall defines a pin-receiving hole 44 and 45. And each sidewall includes a forward facing cover-restricting tab 54 and 52. The bottom 48 includes a web bar 50.

Figure 8:
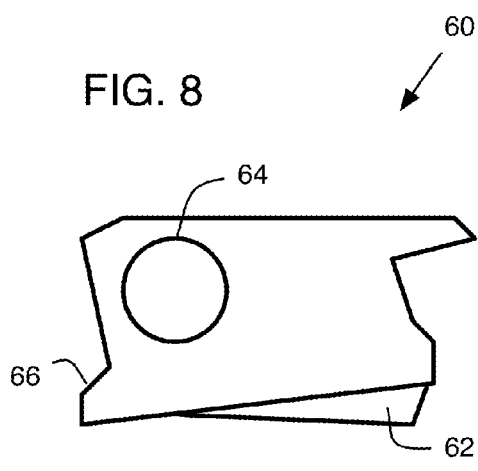
FIG. 8 is a side view of the latch cam of FIG. 1.
Figure 9:
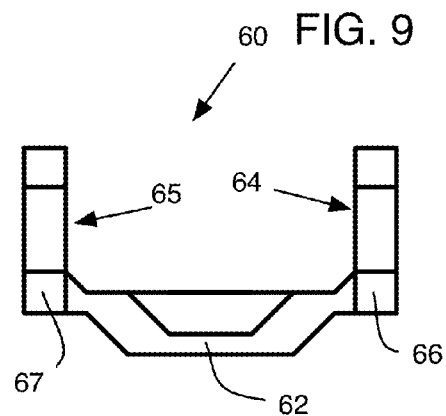
FIG. 9 is a front view of the latch cam of FIG. 8.
Figure 10:
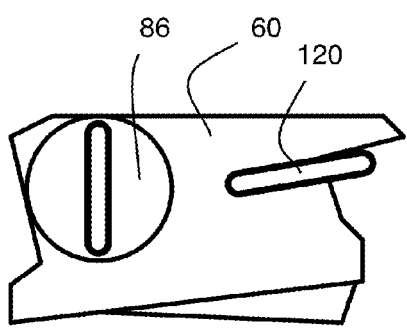
FIG. 10 is a side view of the latch cam assembled to a pin and two springs of the embodiment of FIG. 1.
Figure 11:
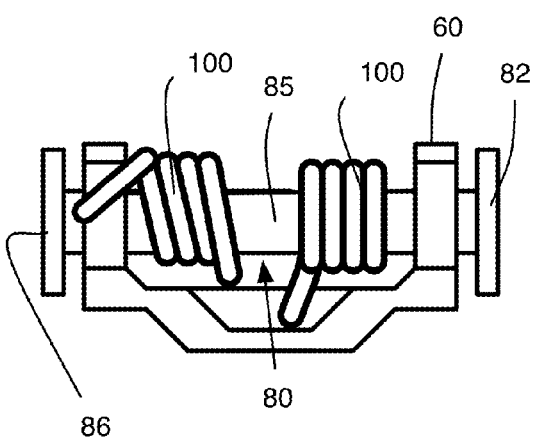
FIG. 11 is a front view of the assembly of FIG. 10.

FIGS. 8-10 detail the latch cam 60 and FIGS. 11-12 detail the latch cam 60 relative to the pin 80 and first and second springs 100, 120. Importantly, the latch cam 60 includes a first tooth 66 and second tooth 67 on a front portion of the latch cam body. Each tooth engages a corresponding ledge 36, 37 on the cover 20 to control when the latch releases the female clasp relative to the cover travel (as previously described). The latch cam includes a pair of oppositely disposed sidewalls; each sidewall includes a pin-receiving hole. A bottom connects the two sidewalls. And, the bottom defines a tab lock 62 for engaging and securing a mating feature on the female clasp (not shown in these figures).

FIGS. 12-15 better illustrate the cooperation between the cover, the frame, and the latch cam to require at least about 80-degrees of travel by the cover relative to a horizontal line to release the clasp. Thus, the buckle assembly 15 selectively couples to the clasp 90 and selectively releases from the clasp when the cover 20 of the clasp attains at least 70-degrees of rotation upward from a horizontal (closed) position.

Figure 19:
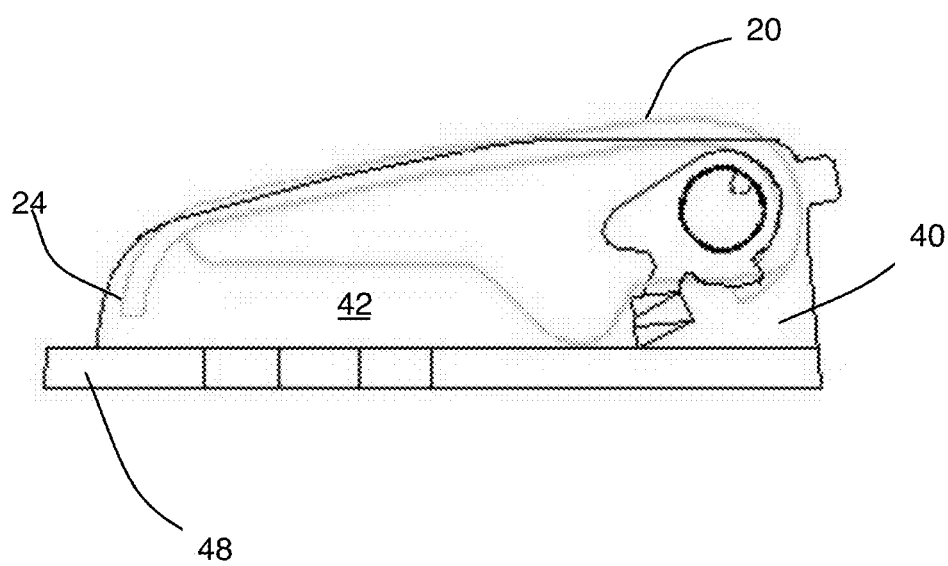
FIG. 19 is a left side view of the first preferred embodiment of the present invention, however the left sidewall of the frame member has been removed to better illustrate the relationship of the cover to the frame when in a closed position.
Figure 20:
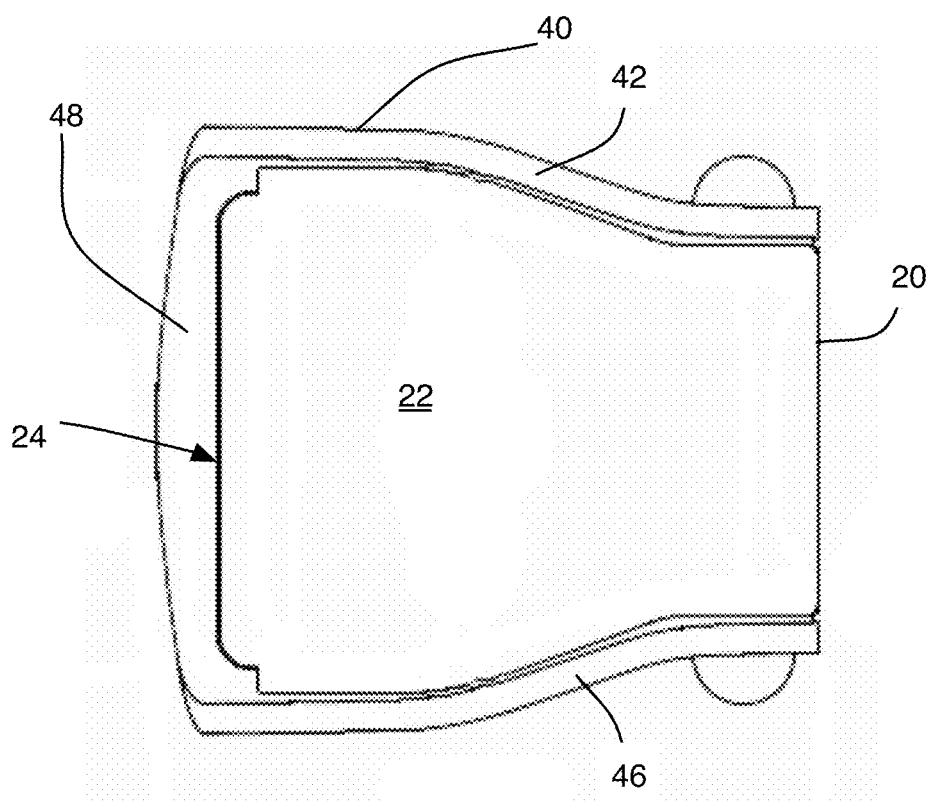
FIG. 20 is a top view of a buckle device of FIG. 1.

FIGS. 19 and 20 illustrate the frame 40 having a bowed edge adjacent to the downward turned lip 24 of the cover. The frame sidewalls 42 and 46, along with the bottom wall 48 protrude beyond the cover 20 in the closed position. This arrangement of frame elements helps secure the cover against unintended opening.

More specifically, FIG. 12 shows the normally closed position j-both the cover and the latch are at 0-degrees relative to the horizontal frame. FIG. 13 shows about 30-degrees of upward rotation of the cover relative to the frame, but the latch cam remains at 0-degrees. FIG. 14 shows the cover at about 45-degrees and yet the latch cam remains at 0-degrees. And, FIG. 15 shows the cover at about 70-degrees and the clasp latch cam is at about 20-degrees—and this enables the female clasp to be pulled from the buckle with minimal effort.

In other embodiments, the release spring and cover may be paired to provide different angles at which the clasp is released: It is therefore contemplated that at least 45-degrees to about 135 degrees (negative 45 degrees) of cover rotation may be desired to open the latch-cam and release the clasp.

Figure 16:
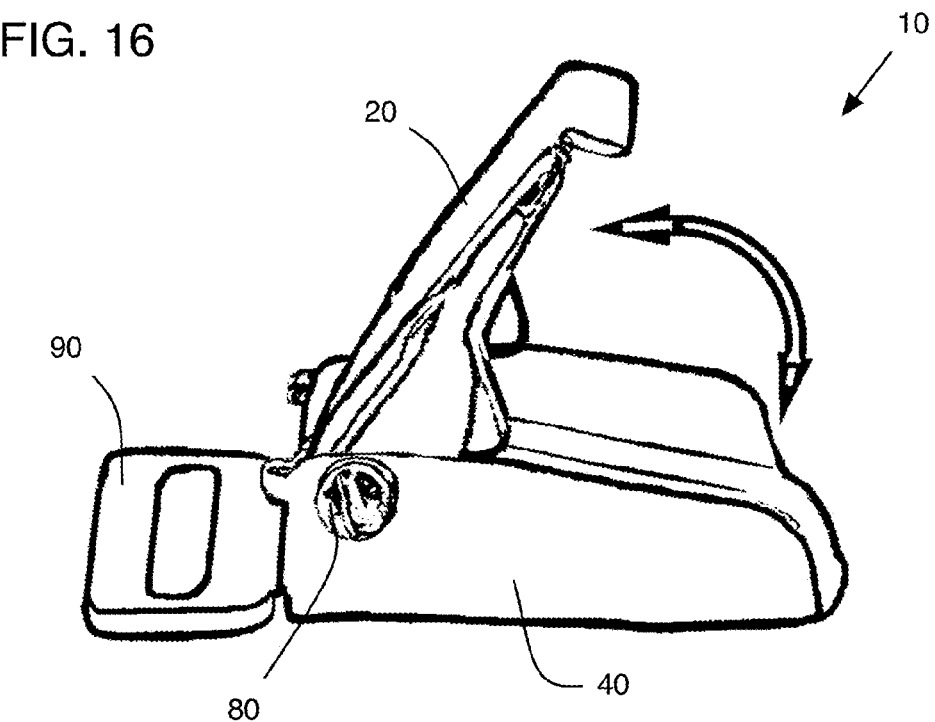
FIG. 16 is an offset side view and illustrates a buckle assembly according to a first preferred embodiment of the present invention in a partially closed position.
Figure 17:
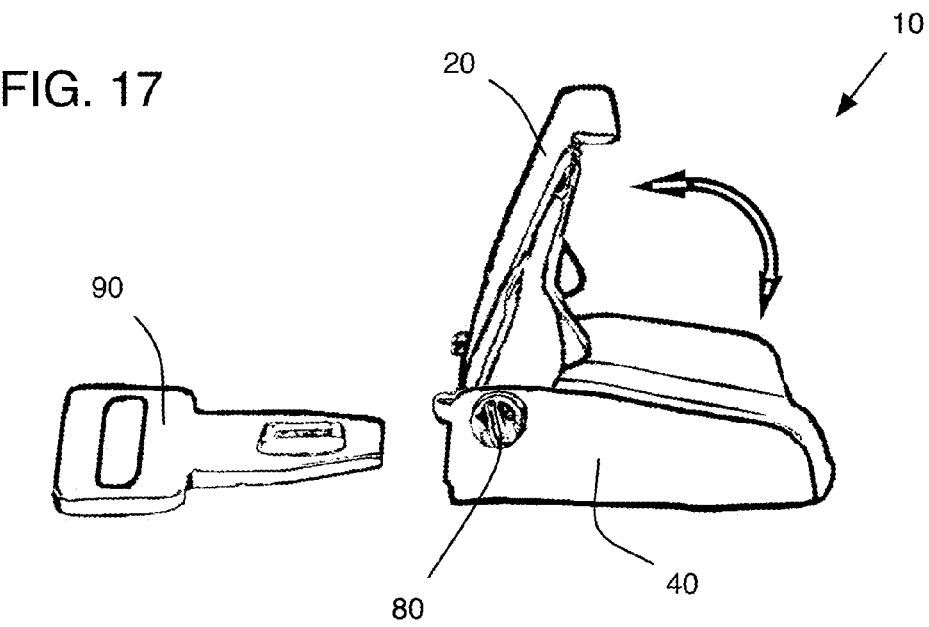
FIG. 17 is an offset side view of the assembly of FIG. 16 in a normally closed position.

FIGS. 16 and 17 illustrate a buckle assembly 10 according to a preferred embodiment of the present invention. FIG. 16 shows a cover 20 moving toward the release or open position. The cover 20 includes a downward turned lip. A female clasp member 90 is inserted in the buckle frame 40. In this view, the cover has not yet traveled far enough to cause the latch lock (not shown in this figure) to release the clasp from the buckle. FIG. 17 shows the assembly 10 in a normally closed position.

Making general reference to FIGS. 1-17 and 19-20, a first preferred embodiment of the present invention contemplates a buckle device for a strap member wherein the strap member comprises a collar for a domestic pet, such as a dog collar. The device comprises a female clasp element 90 coupled to an end of the collar at a clasp web end, as would be conventionally understood. The webbing of a collar, accordingly, can overlap a webbing bar on the clasp web end and the overlapping collar end is then mechanically fastened to itself by means of rivets, or stitching or other known methods. The clasp element 90 further includes a latch-engaging end opposite the clasp web end, the latch-engaging end defining a latch-receiving hole, which selectively engages the buckle assembly, as would be generally understood in the art; however, the release of the clasp element is contrary to the conventional teaching in the art, and its operation is further described below.

In this first preferred embodiment, the present invention contemplates a mating buckle assembly 15 disposed on an opposite end of the collar webbing. The buckle assembly couples to the collar webbing in a conventional manner, as would be appreciated by those skilled in this art. The buckle assembly includes a frame member 40 having a generally flat base 48 (or bottom) and two oppositely disposed upturned sidewalls, a left sidewall 46 and a right sidewall 42. Each respective sidewall defines a pin-receiving hole, namely a left pin-receiving hole 45 and a right pin-receiving hole 44. Further, each respective sidewall includes a cover-restricting tab, the tab disposed on a front portion of each respective sidewall, specifically a left tab 52 and a right tab 54.

The buckle assembly 15 of this first preferred embodiment further includes a pin member 80 disposed on the frame member 40 between the cooperating pin-receiving holes (44, 45) of each respective sidewall (42, 46) of the frame 40. The pin 80 includes a pin-head 82 at one end and a tail 84 at an opposite end with an intermediate pin shaft 85 extending between both ends. The tail couples to a pin end cap 86, as would be understood in the art. And, the pin is free to rotate about 360-degrees around its long axis, extending through the cover, frame and latch assembly and supporting each of these components relative to the frame. Another suitable pin member comprises a one-piece pin where the end is held with split-lock washer. Yet another suitable pin member comprises a one-piece pin that bends at the end so it will not come out. Other contemplated pin members include a rivet, or a threaded rod with nut on the end, for example.

Further, the two oppositely disposed upturned sidewalls 42, 46 of the frame member 40 and the flat bottom base 48 both cooperate to define a three-dimensional space having a length, width, and height.

The buckle assembly further includes a cover member 20, which is hingeably disposed on the pin member 80. The cover 20 adapts to selectively operate from a closed position to an open position. The cover includes a top portion 22 with two oppositely disposed downward turned sidewalls, left cover sidewall 26 and right cover sidewall 28. The cover member having a downward turned release lip 24 disposes within the aforementioned three dimensional space defined by the frame 40 when in the closed position. In this manner the lip 24 of the cover 20 does not extend beyond a curved plane defined by the base 48 and upturned sidewalls (42, 46) of the frame member 40. FIG. 19 illustrates this relationship of the cover 20 to the frame 40. In FIG. 19 the left sidewall is removed enabling the viewer to see the right sidewall 42 and base 48 relative to the cover 20 with downturned lip 24, which lies inside the three-dimensional space formed by the frame when in the closed position.

Further, each sidewall defines a pin-receiving through hole 30, 32 corresponding to the same feature on the frame sidewalls. The cover, importantly, includes a downward turned release end 24. This release end 24 extends from the cover top and turns downward, and cooperates with the frame to provide a very small gap between the cover and the frame—this is important to prevent the cover from being moved from the normal closed position to the release position. This feature prevents the unwanted and unintended operation of the latch mechanism to release the female clasp from the buckle assembly.

The cover further includes a front nose portion 34 having a left and right ledge feature 36, 37. The left ledge 35 and right ledge 37 correspond to a mating feature (tooth 66 and 67) on the latch-cam 60 to rotate the latch from the normally closed and locked position to the release (or open position)—only after at least about 80-degrees of travel of the cover—determined by upward motion from the horizontal frame member as reference.

The buckle assembly 15 further includes a latch-lock cam member 60 disposed on the pin member 80. As conventionally understood, the latch cam locks the female clasp lever in the assembly. In the normally closed position, the clasp can only be released from the assembly by a physical manipulation of the cover (upward rotation of the cover) by the user. However, unlike the conventional teaching, the present invention requires additional travel to release the latch.

The buckle assembly 15 further includes a first, cover-engaging, spring member 100 disposed on the pin and a second, latch-lock engaging, spring member 120 adapted to contact the latch-lock, biasing the latch lock in the closed position until the bias is removed by engaging the cover.

In the preferred embodiments, the cover, latch cam, and frame are stamped from steel; however, other fabrication processes and materials would work equally well. Therefore, it is contemplated that other embodiments of the present invention may be made from cast steel, bent metal, stamped metals and their alloys. For example, brass, nickel, bronze, stainless steel, or aluminum could work equally well.

Figure 18:
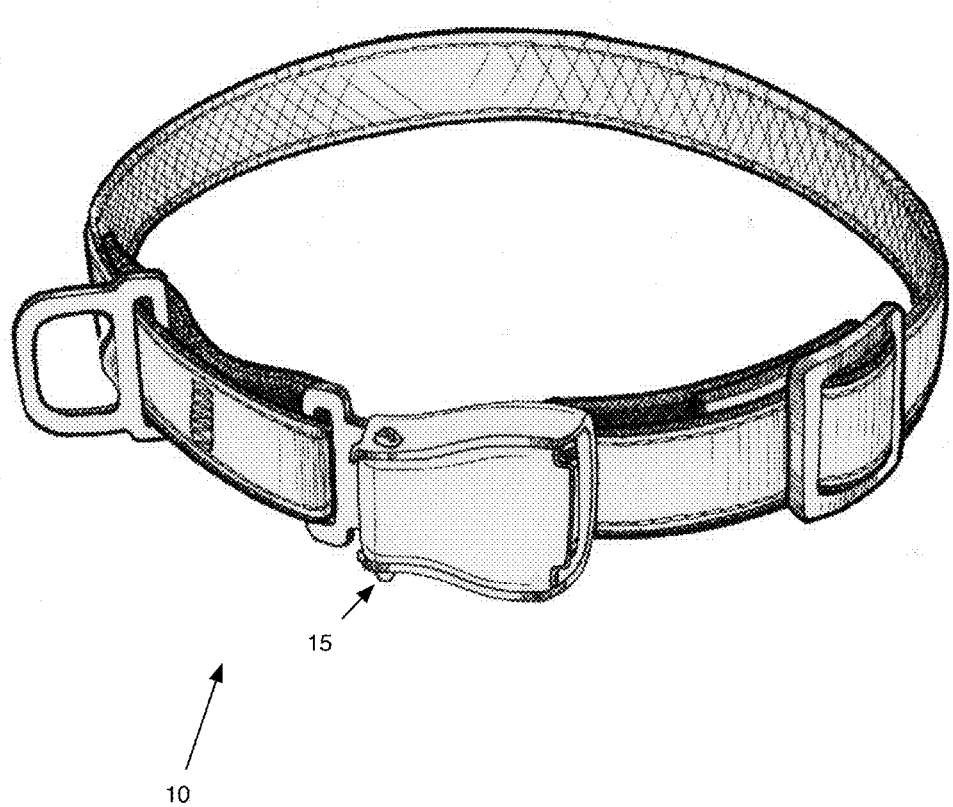
FIG. 18 is an offset front view illustrating a second preferred embodiment of the present invention.

FIG. 18 illustrates a second preferred embodiment of the present invention. This embodiment includes the buckle assembly as described in the first preferred embodiment and include a web-material to make a collar assembly.

This second preferred embodiment contemplates a combination D-ring and bottle opener, which serves much as a conventional D-ring and enables a secure means for coupling the collar to a leash and for hanging an I.D. tag, but also serves as a bottle opener without requiring removal of the collar or opener from the pet's neck to use it as a bottle opener.

Further, this second preferred embodiment of the present invention contemplates a collar consisting of a two-ply material; one ply consists of reclaimed bicycle inner tube rubber, the second ply consists of a hydrophobic material such as nylon or polyester. The combination of a stretchable material (rubber) and a non-stretch material (nylon or polyester) attached with interlocking stitching results in a laminate that has a controlled amount of stretch. The amount of stretch can be varied by changing the length and tension of the interlocking stitch.

The use of small, controlled amount of stretch adds a cushioning element to the collar and reduces the force on the dog's neck from a leash. Because the force felt by the animal around the neck is a function of the mass of the collar and leash times the acceleration, a reduction in acceleration due to a stretch or resiliency designed into the collar due to the spacing of the stitching and ply materials results in a corresponding reduction of the force on the dog's neck. This results in a collar that is comfortable for the dog to wear, resists fraying of the edges, is quick drying, and resists odors.

Other features and advantages contemplated include: An adjuster or slider for adjusting sizing of the collar without creating a loose collar end; A bottle opener with features to enable simultaneous use as a bottle opener and hold an I.D. tag, and hold a leash clasp, while still being worn around a dog's neck; The combination D-ring and bottle opener couples to the collar in a way to allow movement parallel with the webbing of the collar; The dog collar D-ring bottle opener can be used to tie, clasp, or attach a leash to the dog collar in a way that collar/leash attachment point can withstand considerable force; The smooth rubber surface of the inner ply of the collar will not catch or pull dog's fur; The D-ring/bottle rotate substantially about 180-degrees around the center point of the attachment point on the collar to the bottle pry feature to arrange along the long-axis of the collar so that the collar need not be removed to be operable as a bottle opener; and The D-ring bottle opener includes a formed loop (prying point for the bottle cap) at the center point of the D-ring.

Figure 21:
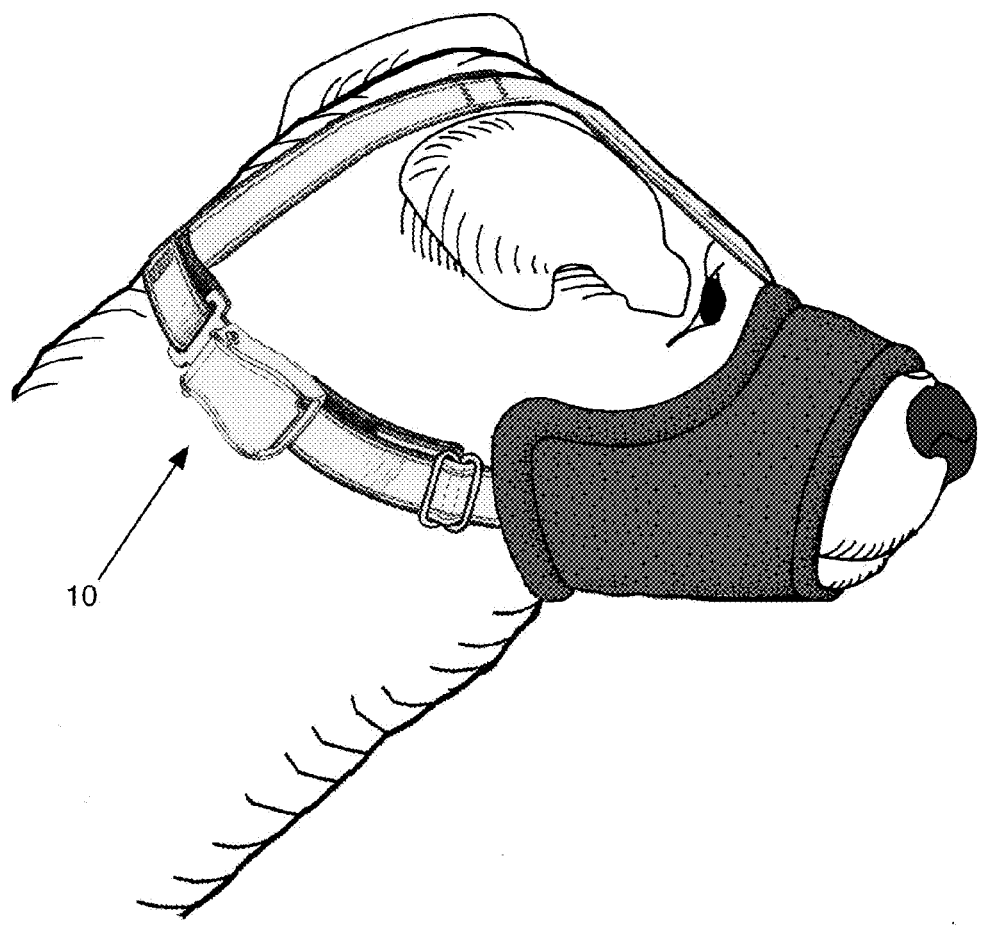
FIG. 21 illustrates a buckle according to a preferred embodiment of the present invention used on a muzzle.
Figure 22:
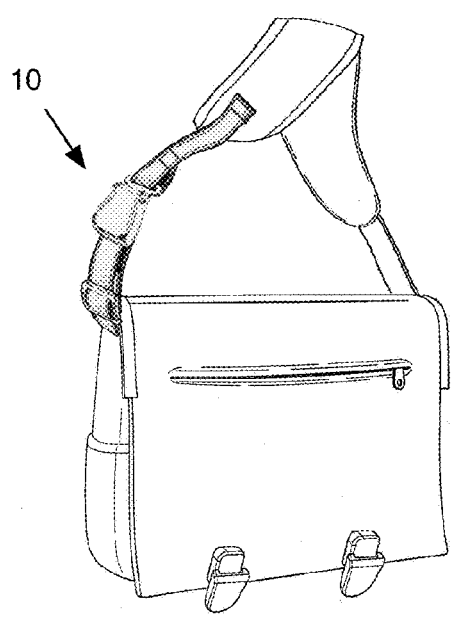
FIG. 22 illustrates a buckle according to a preferred embodiment of the present invention used on a shoulder strap coupled to a bag.
Figure 23:
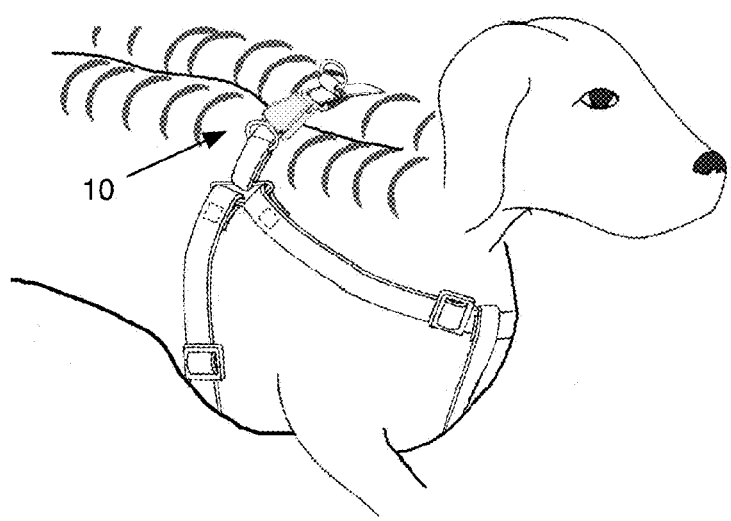
FIG. 23 illustrates a buckle according to a preferred embodiment of the present invention used on a harness.

In other preferred embodiments, for example as FIGS. 21-23 illustrate, the buckle device 10 of the present invention is well suited as both a fashion accessory or as a general purpose fastening device for opposing ends of any strap member such as a shoulder strap, belt, pet collar, and the like. For example, FIG. 22 shows the buckle device 10 used as both a practical means for connected a shoulder strap as well as a fashion accessory for a purse, bag, messenger bag and the like. The buckle 10 is also useful to couple ends of a dog's muzzle, as FIG. 21 shows, or for use on a pet harness, as FIG. 23 illustrates. These exemplary uses serve merely as possible contemplated uses, but should not be considered limiting. For example, such a buckle device could be used on a pet back pack designed to be carried by a domestic animal. Further, the buckle device 10 of the present invention is well-suited to any application where two strap ends need to be releasably coupled. Further, the buckle device 10 is well-suited to applications where there is a desire to avoid accidental or unwanted release of the latch from the buckle, or in applications were the latch release lever may be subject to inadvertent tugging, catching or pulling, and thus the over-extending frame member protects the latch lip from being caught or snagged.

Although the invention has been particularly shown and described with reference to certain embodiments, it will be understood by those skilled in the art that various changes in form and detail may be made without departing from the spirit and scope of the invention.

I claim:

1. A buckle device for a strap, the device comprising:
a female clasp element coupled to an end of the strap at a clasp web end, the clasp element further comprising a latch-engaging end opposite the clasp web end, the latch-engaging end defining a latch-receiving hole;
a buckle assembly disposed on the strap, the assembly comprising
a frame member having a generally flat bottom base and two oppositely disposed upturned sidewalls, each respective sidewall defining a pin-receiving hole;
a cover member hingeably disposed on the frame and adapted to selectively operate from a closed position to an open position, the cover member comprising a downward turned release lip for grasping and a downward curving nose portion opposite the downward turned release lip; and
a latch-lock cam member disposed on the frame, the latch-lock cam member comprising a tab lock supported by oppositely disposed latchcam sidewalls, each latchcam sidewall defining a latch-cam-pin-receiving through hole, and at least one tooth disposed on a front portion of the latch-lock cam member whereby the tooth selectively engages the latch-receiving hole on the female clasp element,
wherein the downward curving nose portion includes at least one cut-out ledge formed sufficiently deep into the downward curving nose portion length such that the latch-lock cam member will not disengage from the latch-receiving hole on the female clasp element until the cover member reaches between approximately 70 degrees and 135 degrees angle from the frame when the downward turned release lip is grasped and pulled rotatably away from the frame.

2. The buckle device of claim 1 further comprising:
a first, cover-engaging, spring member disposed on the frame.

3. The buckle device of claim 2 further comprising:
a second, latch-lock engaging, spring member adapted to contact the latch-lock, biasing the latch lock in the closed position until the biasing is removed by engaging the cover.

4. The buckle device of claim 1 whereby:
the buckle assembly is selectively couples to the clasp and selectively releases from the clasp when the cover of the clasp attains at least approximately 45-degrees of rotation upward from a horizontal (closed) position.

5. The buckle device of claim 1, wherein the strap is comprised of a web-material and has a first end coupled to the clasp element and a second end coupled to the buckle assembly.

6. The buckle device of claim 5 wherein the web-material comprises:
a two-ply material whereby a first ply comprises bicycle inner tube rubber.

7. The buckle device of claim 5 further comprising:
a combination bottle-opener d-ring assembly coupled to a portion of the web-material.

8. The buckle device of claim 1 further comprising:
the two oppositely disposed upturned sidewalls of the frame member and the flat bottom base cooperate to define a three-dimensional space having a length, width, and height; and
the cover member having the downward turned release lip disposed within that three-dimensional space when in a closed position whereby the downward turned release lip is contained entirely within the three-dimensional space defined by the flat bottom base and upturned sidewalls of the frame member.

9. The buckle device of claim 1 whereby:
the buckle assembly is selectively couples to the clasp and selectively releases from the clasp when the cover of the clasp attains at least approximately 135 degrees of rotation upward from a horizontal (closed) position.

10. The buckle device of claim 1 wherein the frame further comprises:
one or more cover restricting tab(s), the tab(s) disposed on a front portion of each respective sidewall of the frame, whereby overtravel of the cover is restricted by the cover-restricting tabs on the sidewalls of the frame member.

11. The buckle device of claim 1 wherein the frame further comprises:
a pin member disposed on the frame member between the pin-receiving holes of each respective sidewall of the frame.

12. The buckle device of claim 1 whereby:
the buckle assembly selectively couples to the clasp and selectively secures the clasp when the cover is in its closed position until the clasp attains at least approximately 45-degrees of rotation upward from a horizontal (closed) position.

13. A buckle device comprising:
a buckle assembly disposed on a strap member, the assembly comprising
a frame member having a generally flat bottom base and two oppositely disposed upturned sidewalls, each respective sidewall defining a pin-receiving hole and a cover restricting tab, the tab disposed on a front portion of each respective sidewall, and wherein the two oppositely disposed upturned sidewalls of the frame member and the generally flat bottom base cooperate to define a three-dimensional space having a length, width, and height;
a cover member hingeably disposed on the frame and adapted to selectively operate from a closed position to an open position, the cover member comprising a downward turned release lip and the downward turned release lip disposed within the three dimensional space of the frame when in a closed position whereby the downward turned release lip does not extend beyond a curved plane defined by the generally flat bottom base and upturned sidewalls of the frame member; and
a latch-lock cam member disposed on the frame, the latch lock comprising a tab lock supported by oppositely disposed latchcam sidewalls, each sidewall defining a latch-cam-pin-receiving through hole and at least one tooth disposed on a portion of a front of the latch-lock cam member whereby the tooth selectively engages a latch-receiving hole on a female clasp element.

14. The buckle device of claim 13 further comprising:
a female clasp element comprising a latch-engaging end, the latch-engaging end defining a latch-receiving hole.

15. The buckle device of claim 13 further comprising:
the strap member comprises a collar made of a two-ply material wherein at least one ply is a rubber, and the collar couples to the frame.

16. The buckle device of claim 15 further comprising:
a combination bottle opener d-ring coupled to the collar.

17. The buckle device of claim 13 further comprising:
the strap member comprises a harness.

18. The buckle device of claim 13 wherein the strap member comprises a muzzle.

19. The buckle device of claim 13 wherein the strap member comprises a shoulder strap for a bag.

20. The buckle device of claim 13 wherein the cover further comprises:
an oppositely disposed cover nose having at least one cutout ledge and whereby overtravel of the cover is restricted by the cover-restricting tabs on a front portion of each respective one of the sidewalls of the frame member.

21. An apparatus, comprising:
a dog collar including:
a strap having a first end and a second end opposite the first end of the strap;
a female clasp attached to the first end of the strap and having an oppositely disposed latch-engaging end with a latch-receiving hole; and
a limited release buckle attached to the second end of the strap, the limited release buckle having:
a frame and a cover connected together and shaped to cooperate together so as to eliminated unintended or unwanted movement of the cover from a normally closed position to an open position that will release the female clasp from the limited release buckle, wherein the frame has a bottom base and two oppositely disposed upturned sidewalls and
the cover is pivotably attached to the frame and disposed between the upturned sidewalls, the cover comprising a downward turned release lip for grasping and rotating the cover from a normally closed position to an open position, the downward turned release lip shaped so as fit within the frame and to not extend beyond a curved plane defined by the bottom base and two oppositely disposed upturned sidewalls of the frame so that the cover selectively operates from the normally closed position to the open position relative to the frame only when intentionally grasped and rotated toward the open position, whereby the shaped of the frame and cover cooperate together to eliminated unintended or unwanted movement of the cover from the normally closed position to the open position.

22. The apparatus of claim 21, wherein the limited release buckle further comprises a cam latch, and at least one spring that are connected together and shaped to cooperate together such that the cam latch resists opening and releasing the latch-engaging end of the female clasp from the limited release buckle until the cover has traveled at least more than approximately 45 degrees from a normally closed position with the frame.

23. The apparatus of claim 21, wherein the limited release buckle comprises:
the frame having a bottom plane;
the cover pivotably connected to the frame, the cover having a downward turned release lip for grasping and a downward curving nose portion opposite the downward turned release lip;
a cam latch connected to the cover and frame for latching the female clasp to the limited release buckle, the cam latch having at least one tooth disposed on a front portion of the cam latch for selectively engaging the latch-receiving hole on the female clasp when the cover is in a normally closed position relative to the frame; and
at least one spring, wherein the downward curving nose portion includes at least one cut-out ledge formed sufficiently deep into the downward curving nose portion length such that the cam latch will not disengage from the latch-receiving hole on the female clasp until the cover reaches between approximately 45 degrees and 135 degrees angle from the bottom plane of the frame when the downward turned release lip is grasped and pulled rotatably away from the frame.

24. The apparatus of claim 21, wherein the limited release buckle includes:
the frame and the cover connected together and shaped to cooperate together so as to eliminated unintended or unwanted movement of the cover from a normally closed position to an open position that will release the female clasp from the limited release buckle; and
a cam latch and at least one spring that are connected together with the frame and the cover, and shaped to cooperate together such that the cam latch resists opening and releasing the latch-engaging end of the female clasp from the limited release buckle until the cover has traveled at least more than 45 degrees from a normally closed position with the frame.

25. The apparatus of claim 21, further comprising:
a combination bottle opener D-ring assembly coupled to the dog collar.

26. The apparatus of claim 21, wherein the collar is made of a two-ply material including at least one ply being made of rubber.

* * * * *